(12) United States Patent
Hutt et al.

(10) Patent No.: US 8,041,398 B2
(45) Date of Patent: Oct. 18, 2011

(54) METHOD FOR REALIZING A PRESENCE SERVICE AND PRESENCE SYSTEM

(75) Inventors: Manfred Hutt, München (DE); Florian Nierhaus, München (DE); Rainer Zimmermann, Paderborn (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 763 days.

(21) Appl. No.: 11/547,519

(22) PCT Filed: Aug. 29, 2005

(86) PCT No.: PCT/EP2005/054228
§ 371 (c)(1),
(2), (4) Date: Oct. 2, 2006

(87) PCT Pub. No.: WO2006/034933
PCT Pub. Date: Apr. 6, 2006

(65) Prior Publication Data
US 2009/0191851 A1    Jul. 30, 2009

(30) Foreign Application Priority Data
Sep. 30, 2004    (DE) .......................... 10 2004 047 689

(51) Int. Cl.
*H04M 1/00*    (2006.01)
(52) U.S. Cl. ........ 455/566; 455/466; 709/204; 709/205; 709/206
(58) Field of Classification Search ................... 455/566, 455/466, 418, 420; 709/204–206
See application file for complete search history.

(56) References Cited

U.S. PATENT DOCUMENTS

| | | | |
|---|---|---|---|
| 6,677,968 B1 | 1/2004 | Appelman | |
| 7,139,797 B1* | 11/2006 | Yoakum et al. | 709/204 |
| 2003/0037103 A1 | 2/2003 | Salmi | |
| 2004/0062383 A1* | 4/2004 | Sylvain | 379/265.06 |
| 2004/0170263 A1* | 9/2004 | Michael et al. | 379/201.1 |
| 2004/0248597 A1 | 12/2004 | Mathis | |
| 2005/0021854 A1 | 1/2005 | Bjorkner | |
| 2005/0108348 A1* | 5/2005 | Lee | 709/207 |
| 2006/0009243 A1* | 1/2006 | Dahan et al. | 455/466 |

(Continued)

FOREIGN PATENT DOCUMENTS

EP    1396987 A2    10/2004

(Continued)

OTHER PUBLICATIONS

Siemens Aktiengesellschaft, "ISDN im Büro-HICOM", Anwendernutzen und Technik des ISDN-Kommunikationsystems HICOM, Sonderausgabe telcom report und Siemens-Magazin COM, 1985, pp. 1, 4, 5, 26-31, 58-66.

*Primary Examiner* — Rafael Pérez-Gutiérrez
*Assistant Examiner* — Issam Chakour

(57) ABSTRACT

In one aspect, a method for realizing a presence service with a buddy list that can be displayed on a display device of a terminal is provided. In an activated state, the buddy list itself is displayed, and in a deactivated state, the buddy list itself is not visible. The buddy list is updated by a control device during a change in state of at lest one subscriber to be monitored and/or of at least one device assigned to the subscriber. According to the invention, the updating of the buddy list ensues in the deactivated state by means of the control device while using a method other than one used in the activated state.

18 Claims, 3 Drawing Sheets

U.S. PATENT DOCUMENTS

2009/0138566 A1 5/2009 Ito

FOREIGN PATENT DOCUMENTS

| | | |
|---|---|---|
| EP | 1 549 013 A1 | 6/2005 |
| EP | 1936893 A2 | 6/2008 |
| EP | 1370982 B1 | 12/2008 |
| WO | WO 2004/028178 A2 | 4/2004 |
| WO | 2004/057816 A1 | 7/2004 |
| WO | 2005/011298 A2 | 2/2005 |
| WO | WO 2005/072494 A2 | 8/2005 |

* cited by examiner

METHOD FOR REALIZING A PRESENCE SERVICE AND PRESENCE SYSTEM

CROSS REFERENCE TO RELATED APPLICATIONS

This application is the US National Stage of International Application No. PCT/EP2005/054228, filed Aug. 29, 2005 and claims the benefit thereof. The International Application claims the benefits of German application No. 102004047689.6 DE filed Sep. 30, 2004, both of the applications are incorporated by reference herein in their entirety.

FIELD OF INVENTION

The present invention relates to a method for reducing the number of change messages to be transmitted to achieve what is known as a "presence service", and to a corresponding presence system.

BACKGROUND OF INVENTION

From the Siemens product document "ISDN im Büro HICOM", special edition of telecom report and Siemens magazine COM, 1985, ISBN 3-8009-3849-9, in particular pages 26 to 31 and 58 to 66, is known a communications system which provides additional functions apart from switching-related functions. Additional functions of this type are generally called features, with a known feature being what is referred to as a "presence service". By virtue of the "presence service" feature a user is shown on a terminal with which he is associated, for example a telephone or personal computer, information about the current state of other users or their terminals. This information is often organized in the form of a list—often called a Buddy List in the literature. The users on the list can usually be freely configured, for example all people working on a project or the employees of a department can be summarized in a list of this type.

To be able to achieve a real-time presence service it is necessary for all changes in the status—for example taking up or replacing a telephone receiver in the case of a telephone terminal—of the monitored user to be identified and change messages to be transmitted to the corresponding terminals to update the lists. This can sometimes lead to high loading of the system. If, for example, a system with 50 users per list, 20,000 devices to be monitored, 10 updates per hour and user and a transmission rate of 1 kbyte per update, is taken as a starting point, then this alone leads to a system load of 22.76 Mbit/s for the change messages.

SUMMARY OF INVENTION

One possibility of reducing the system load lies in reducing the number of change messages transmitted via the presence system. One known possibility for reducing the change messages is for not all of the changes in state to be transmitted to the terminals by the presence system. However this can lead to precisely those changes in state being "suppressed" by the presence system which are of interest to a user.

An object underlying the present invention is therefore to disclose an alternative method and a corresponding presence system by way of which the number of change messages to be transmitted via the system may be reduced.

The invention is based on a system in which in an activated state the user information itself is displayed on a display device of a terminal and in a deactivated state the user information itself is not visible. The user information includes information about the users themselves and/or the devices associated with the users, with the user information preferably being organized in the form of a "buddy list" known from the literature.

For the purpose of better comprehension of the present application the term "buddy list" will be used hereinafter instead of the term "user information", where use of the term "buddy list" does not signify any restriction to the organization of the user information in the form of a list.

According to the invention information about whether the buddy list is in an activated or a deactivated state is transmitted to a controller that controls updating of the buddy list, the buddy list being updated in the deactivated state using a different method from that in the activated state.

According to the present invention the buddy list is in a deactivated state if one of the following cases exists:
a) the buddy list is hidden, for example there is a different application in the foreground of the display device,
b) the buddy list is outside of the visible region of the display device,
c) the buddy list is shown only as a symbol representing the buddy list (the buddy list is "iconized"),
d) a portion of the buddy list is shown as a symbol representing the buddy list.

A fundamental advantage of the invention lies in the fact that the method according to the invention can be easily implemented in existing systems.

Advantageous developments of the invention are recited in the dependent claims.

According to one embodiment of the present invention, in the deactivated state the user information is not updated immediately after a change in state of the at least one user to be monitored and/or device associated therewith, but after predetermined time intervals.

As a result of such a reduction of the change messages to be transmitted in the system it is possible, using the same presence system, to monitor a larger number of users or devices and/or administer more buddy lists.

According to a further embodiment of the present invention the time intervals according to which the buddy list is updated are individually set by a user. Updating of the buddy list can thus be adapted to the individual user conditions. Alternatively the time intervals can be set controller-individually, so all buddy lists controlled by the controller are updated simultaneously.

According to a further embodiment of the present invention in the deactivated state the buddy list is only updated in the case of changes in non-realtime-critical states of a user to be monitored. The number of change messages to be transmitted may thus be reduced further. As realtime-critical states usually change several times during the deactivated state, permanent updating of these realtime-critical states is not necessary.

According to a further embodiment the information regarding whether the buddy list is in an activated or a deactivated state is transmitted implicitly in that the connection between the controller and the terminal is broken by the terminal, or alternatively by an explicit message. In the case of an explicit message a distinction can be made as to whether the buddy list is still interested in the update information—for example in the case of a concealment—or whether the buddy list is no longer interested in the update information—for example in the case of iconization.

BRIEF DESCRIPTION OF THE DRAWINGS

An embodiment of the invention will be described in more detail hereinafter with reference to the drawings, in which.

DETAILED DESCRIPTION OF INVENTION

Figure 1:
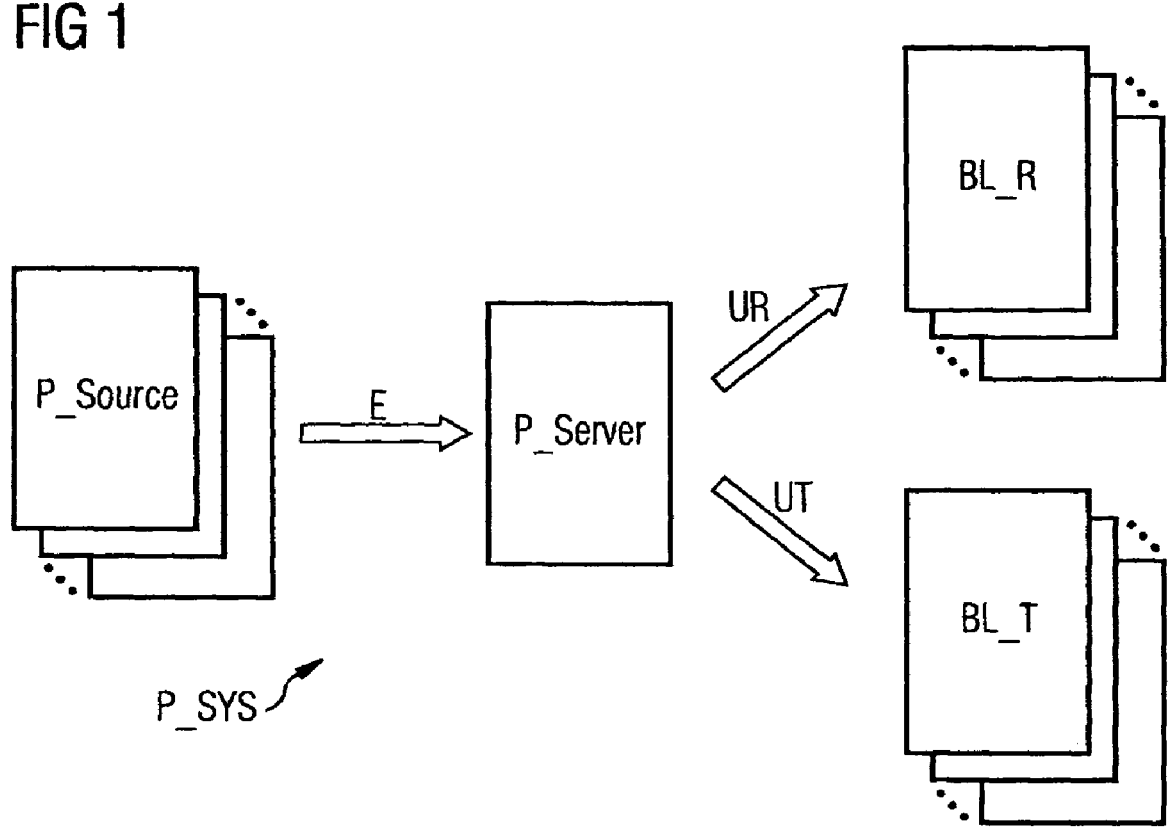
FIG. 1 shows a structural image to schematically illustrate the fundamental functional units involved in the method according to the invention.

FIG. 1 shows a presence system P_SYS with a plurality of users that are to be monitored or devices P_Source associated with the users and a plurality of buddy lists BL_R, BL_T. In this case a change in the state of a user to be monitored or a device P_Source to be monitored is transmitted via a corresponding update message E—often called a presence source event in the literature—to a central presence server P_Server. The presence server P_Server determines the buddy lists BL_R, BL_T in which an entry for the relevant user or the relevant device exists and transmits a corresponding change message UR, UT to the identified buddy lists BL_R, BL_T.

The buddy lists BL_R, BL_T are each displayed on display devices (not shown) of the presence system P_SYS. The display devices can for example be the display of a telephone or an application that runs on a PC. A distinction is made hereby between what are referred to as the "rich client buddy lists" BL_R and "thin client buddy lists" BL_T, where a "rich client" is a terminal with its own processing capacity and a "thin client" is a terminal without its own processing capacity. For example, a "rich client" is realized by a personal computer or a telephone terminal, in particular an IP phone (IP: Internet Protocol), and a "thin client" is realized by a PDA (Personal Digital Assistant) or a web browser running on the personal computer.

In the case of the "thin clients" an additional unit (not shown) that implements control of the "thin clients" with respect to the presence service is required between the presence server P_Server and the "thin clients". Therefore change messages UR, UT that indicate changes in state of the users or devices to be monitored are transmitted from the presence server P_Server either—in the case of the "rich clients"—directly to the corresponding terminals or—in the case of the "thin clients"—to the additional unit.

With the presence system P_SYS according to the invention there is the possibility of shifting buddy list BL_R, BL_T into an activated state and into a deactivated state, the buddy list itself BL_R, BL_T being displayed in the activated state and the buddy list BL_R, BL_T itself not being visible in the deactivated state.

A deactivated state exists for example if
a) the buddy list BL_R, BL_T is hidden—by a different application—on the display device, or
b) the buddy list BL_R, BL_T is outside of the visible region of the display device, or
c) the buddy list BL_R, BL_T is shown only as a symbol representing the buddy list BL_R, BL_T, or
d) a portion of the buddy list BL_R, BL_T is shown by a symbol representing this portion.

The method according to the invention will be described in more detail hereinafter with reference to FIGS. 2 and 3, reference to FIG. 1 continuing to be made for reasons of clarity.

Figure 2:
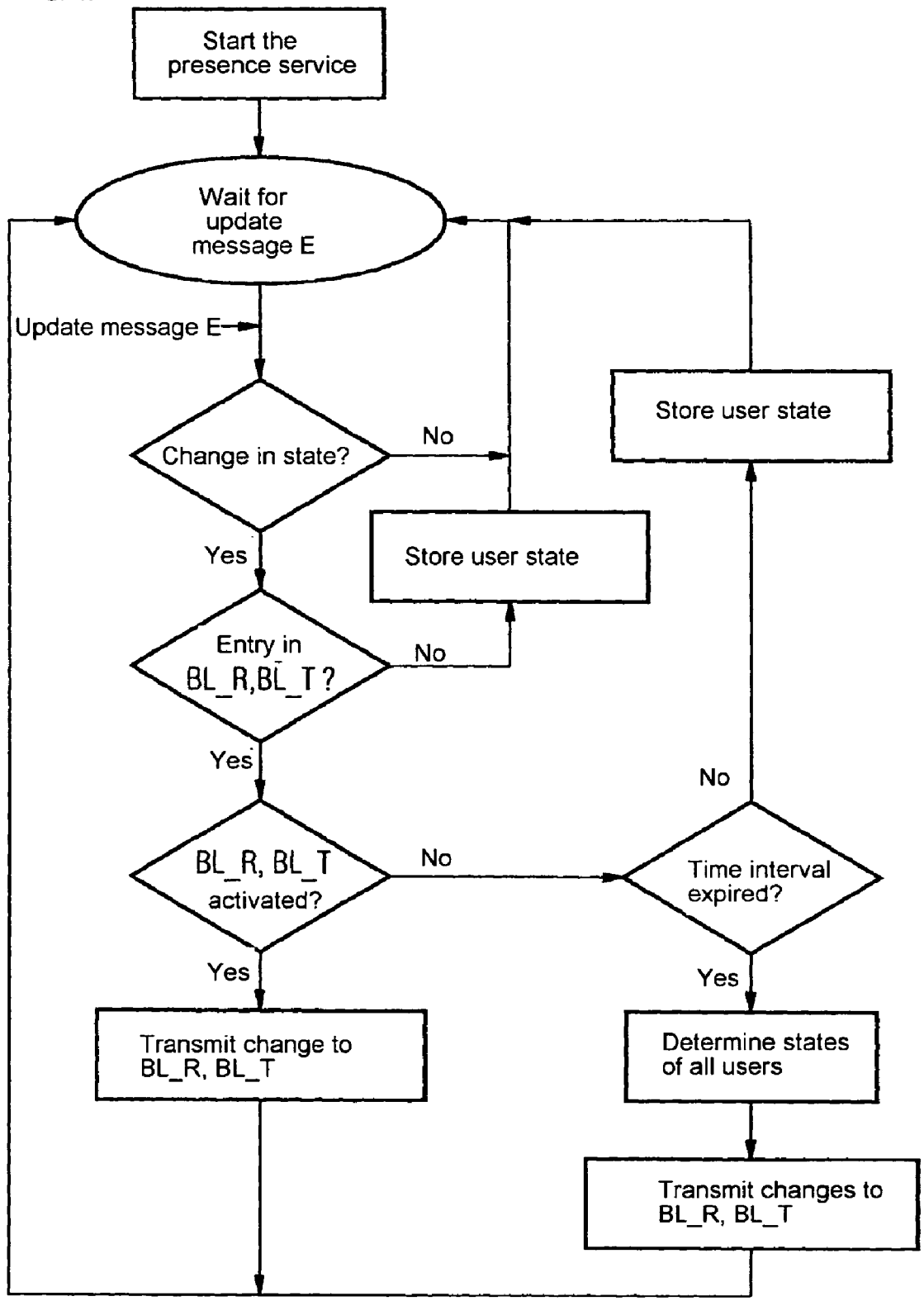
FIG. 2 shows a flow diagram to illustrate the fundamental method steps that are executed in a first embodiment of the invention.

FIG. 2 shows a flow diagram to illustrate the fundamental method steps that are executed in a first embodiment of the invention. In this case, once the presence service has started in the presence server P_Server, there is a wait for arrival of an update message E. When an update message E arrives a check is made as to whether the update message E signals a change in state of a user or a device associated with the user. If this is not the case there is a wait for the arrival of a further update message E.

If, on the other hand, the update message E signals a change in state of the user or device, a check is made in the next step as to whether an entry exists for the user or device in one of the buddy lists BL_R, BL_T. If this is not the case the changed user state is stored in the presence server P_Server and there is a wait for the arrival of a further update message E.

If a corresponding entry does exist in one of the buddy lists BL_R, BL_T a check is made to determine whether the at least one corresponding buddy list BL_R, BL_T is in an activated or a deactivated state. If the at least one corresponding buddy list BL_R, BL_T is in the activated state the change in state is immediately transmitted to the corresponding terminal by the presence server P_Server, so the change in state can be displayed on the display device of the terminal by an updated buddy list BL_R, BL_T. There is then a wait for the arrival of a further update message E again.

If the at least one corresponding buddy list BL_R, BL_T is in the deactivated state on the other hand, the change in state is no longer transmitted to the corresponding terminal immediately but only at predetermined time intervals. If the time interval has not yet elapsed, the changed user status is again stored in the presence server P_Server and there is a wait for the arrival of a further update message E.

If, on the other hand, the time interval has elapsed the last valid state of the at least one user or device to be monitored P_Source is transmitted to the buddy list BL_R, BL_T. If the buddy list BL_R, BL_T includes a plurality of users or devices to be monitored, the states of all users or devices to be monitored is determined by the presence server P_Server and the changes in state are subsequently transmitted to the buddy list BL_R, BL_T collected in a group message. There is then a wait for the arrival of a further update message E again.

A buddy list BL_R, BL_T is updated at time intervals of 30 seconds in each case, for example.

According to a first method the time interval of 30 seconds for updating the buddy list BL_R, BL_T can be kept constant for the entire duration in which the buddy list is in the deactivated state. This has the advantage that no further configurations are required for the method.

According to a second method the time interval may be variable. It is particularly advantageous in this case to increase the time interval for updating the buddy list BL_R, BL_T as the period in which the buddy list BL_R, BL_T is in the deactivated state increases, because experience has shown that the probability of renewed updating of the buddy list BL_R, BL_T constantly decreases with time.

During the period in which the buddy list BL_R, BL_T is in the deactivated state, a check is constantly made as to whether the buddy list BL_R, BL_T has been activated. This may, for example, take place by way of a corresponding message from the terminal to the presence server P_Server. Alternatively the status of the buddy list BL_R, BL_T may be periodically queried by the presence server P_Server. This method is called "polling" in the literature, the time intervals between two polling queries being set such that they are greater than the time interval in order to reduce the system load.

If the buddy list BL_R, BL_T has been activated, changes in state of a user or device to be monitored P_Source are again immediately transmitted to the corresponding terminal by the presence server P_Server.

Figure 3:
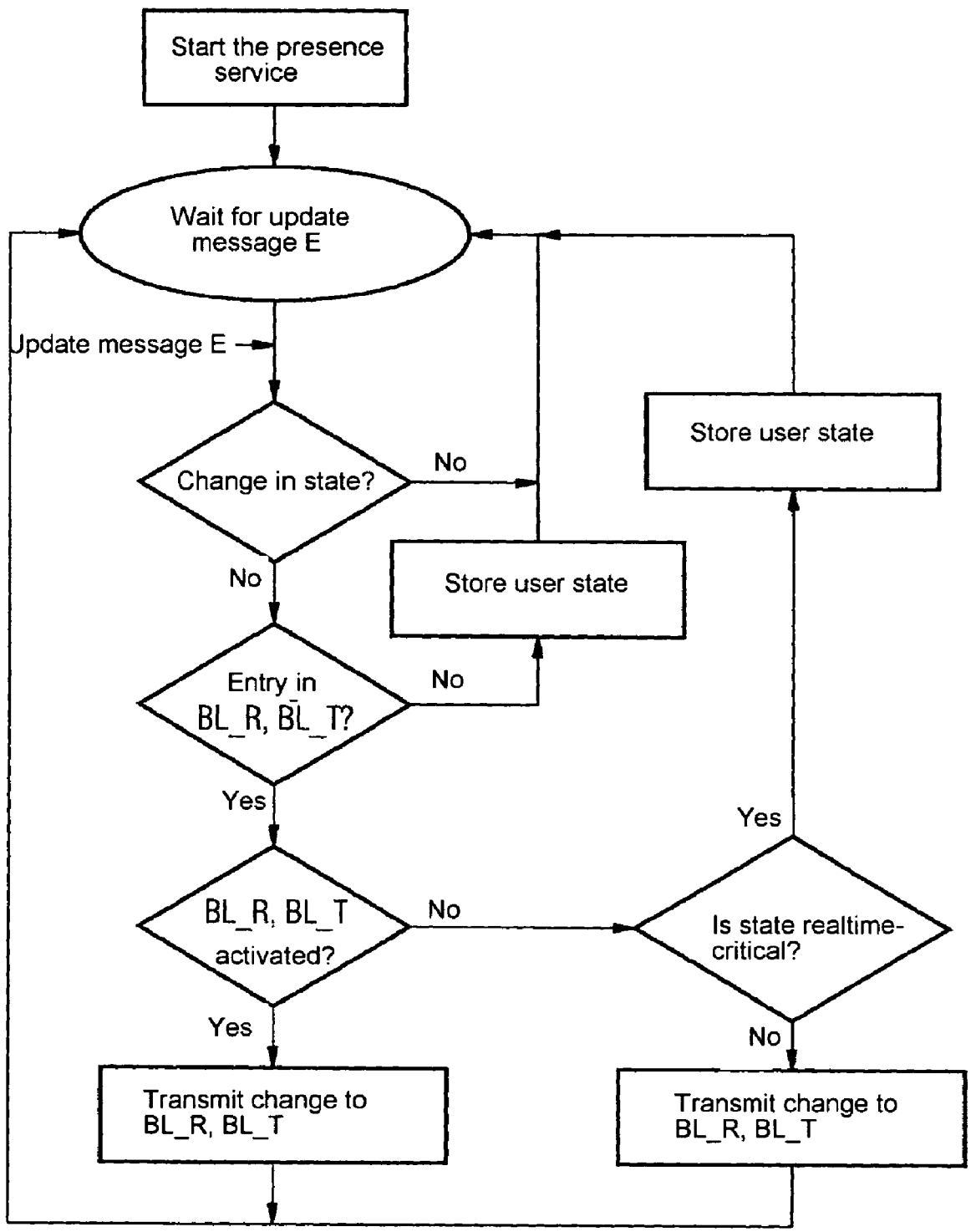
FIG. 3 shows a flow diagram to illustrate the fundamental method steps that are executed in a second embodiment of the invention.

FIG. 3 shows a flow diagram to illustrate the fundamental method steps that are executed in a second embodiment of the invention.

The second embodiment differs from the first embodiment in that, in the deactivated state, instead of updating the buddy list BL_R, BL_T in predetermined time intervals, the buddy list BL_R, BL_T is only updated if a change in a non-realtime-critical state of a user or device P_Source to be monitored exists.

Examples of non-realtime-critical states are inter alia: "user is not in the office", "user is in a meeting" or "user is on vacation". Examples of realtime-critical states are inter alia: "user is busy", "user is free".

This embodiment of the method according to the invention is based on the consideration that realtime-critical states usually change several times during deactivation of the buddy list BL_R, BL_T. Permanent updating of these realtime-critical states in the buddy list BL_R, BL_T is therefore not necessary or requested as they are not required or requested by the user of the buddy list BL_R, BL_T. It is consequently sufficient to update the realtime-critical states accordingly in the buddy list BL_R, BL_T only in the case of renewed activation of the buddy list BL_R, BL_T.

According to a third embodiment of the invention (not shown) the first embodiment is combined with the second one. Consequently in a deactivated state, only non-realtime-critical states of the buddy list BL_R, BL_T are updated at predetermined intervals.

The possibility advantageously exists of a user being able to individually configure the update settings of a buddy list BL_R, BL_T. Thus for example the time interval after which the buddy list BL_R, BL_T is updated can be set user-individually. It is also possible for the time interval to be configurable in such a way that it is changed as a function of the time of day or the presence of the user. Alternatively the time intervals can be set controller-individually, so all buddy lists controlled by the controller are updated simultaneously.

The invention is therefore based on the consideration that only information about changes in state currently required by the buddy list BL_R, BL_T are transmitted from the system to the buddy list BL_R, BL_T. Information about changes in state that are not required are "suppressed" in the presence system.

The change messages UR, UT for updating the buddy list BL_R, BL_T are correspondingly suppressed in the presence server P_Server in the process. The message traffic between the presence server P_Server and the terminals can thus be greatly reduced.

The invention claimed is:

1. A method for achieving a presence service in a communication network, comprising:
    providing a presence server that is configured to wait for arrival of an update message from a device;
    the presence server receiving the update message;
    the presence server checking the update message to determine if the update message signals a change in state of a user or a device associated with the user;
    the presence server determining whether an entry exists for the user or the device associated with the user in at least one buddy list if the presence server determines that the update message signals the change in state of the user or the device associated with the user,
        if no entry in the at least one buddy list exists for the user or the device associated with the user in the at least one buddy list, the presence server awaiting for another update message;
        if an entry exists for the user or the device associated with the user in the at least one buddy list, the presence server determining whether the at least one buddy list is in a deactivated state or an activated state,
            if the at least one buddy list is in the deactivated state, the presence server suppressing sending of any buddy list update message to the at least one buddy list, the buddy list update message configured to identify the change in state of the user or the device associated with the user such that the buddy list update message is not transmitted to the at least one buddy list and storing the change in state and after a predetermined time has elapsed the presence server sending a group message to the at least one buddy list that identifies states of all users of the at least one buddy list and all devices associated with those users of the at least one buddy list; and
            if the at least one buddy list is in the activated state, the presence server sending at least one buddy list update message such that the change in state is indicated on a display device of a terminal device via the at least one buddy list without waiting for the predetermined time to elapse; and
    wherein at least one buddy list is in the deactivated state and the at least one buddy list in the deactivated state is also updated if a change in any non-realtime-critical states of the user or the device associated with the user is detected by the presence server via the update message without waiting for the predetermined time to elapse; and
    wherein the at least one buddy list is configured to display realtime-critical state information of the user or device associated with the user and non-realtime-critical state information of the user or device associated with the user; and
    wherein for the at least one buddy list in the deactivated state, the at least one buddy list in the deactivated state is updated via the group message only for changes in non-realtime-critical states of the users or devices associated with those users of the at least one buddy list.

2. The method as claimed in claim 1 wherein the at least one buddy list is in the deactivated state when the at least one buddy list is hidden on the display device or the at least one buddy list is situated outside of a visible region of the display device.

3. A presence system for achieving a presence service in a communication network, comprising:
    a central presence server;
    a plurality of terminals communicatively coupled to the central presence server;
    at least one buddy list connected to the central presence server and at least one of the terminals of the plurality of terminals, the at least one buddy list comprising status information for each terminal;
    the presence server configured to receive update messages from the terminals;
    for each update message, the presence server configured to check the update message to determine if the update message signals a change in state of at least one of the terminals;
    the presence server also configured to determine if the at least one buddy list is in a deactivated state or an activated state,
        if the at least one buddy list is in the deactivated state, the presence server configured to suppress the sending of any buddy list update message to the at least one buddy list such that the buddy list update message is not transmitted to the at least one buddy list and stores the change in state at least until a predetermined time has elapsed and after the predetermined time has elapsed the presence server sending a buddy list update message to the at least one buddy list that identifies the change in state, each buddy list update message configured to identify the change in state of the at least one terminal of the plurality of terminals; and if the at least one buddy list is in the activated state, the presence server configured to send at least one buddy list update message such that the change in state is displayable on a display device of the at least one of the terminals via the at least one buddy list without waiting for the predetermined time to elapse; and when the at least one buddy list is in the deactivated state the at least one buddy list is hidden by an application such that the at least one buddy list is not displayed on the display device.

4. The presence system as claimed in claim 3, wherein each buddy list update message sent to the at least one buddy list when the at least one buddy list is in the deactivated state is a group message and each terminal is one of a personal computer, a corded telephone, a mobile phone or a Personal Digital Assistant.

5. A method for achieving a presence service in a communication network, comprising:
providing a presence server that is configured to wait for arrival of an update message from a device;
the presence server receiving the update message;
the presence server checking the update message to determine if the update message signals a change in state of a user or a device associated with the user;
the presence server determining whether an entry exists for the user or the device associated with the user in at least one buddy list if the presence server determines that the update message signals the change in state of the user or the device associated with the user,
if no entry in the at least one buddy list exists for the user or the device associated with the user in the at least one buddy list, the presence server awaiting for another update message;
if an entry exists for the user or the device associated with the user in the at least one buddy list, the presence server determining whether the at least one buddy list is in a deactivated state or an activated state,
if the at least one buddy list is in the deactivated state, the presence server suppressing sending of any buddy list update message to the at least one buddy list, the buddy list update message configured to identify the change in state of the user or the device associated with the user such that the buddy list update message is not transmitted to the at least one buddy list and storing the change in state and after a predetermined time has elapsed the presence server sending a group message to the at least one buddy list that identifies states of all users of the at least one buddy list and all devices associated with those users of the at least one buddy list; and
if the at least one buddy list is in the activated state, the presence server sending at least one buddy list update message such that the change in state is indicated on a display device of a terminal device via the at least one buddy list without waiting for the predetermined time to elapse; and
wherein when the at least one buddy list is in the deactivated state the at least one buddy list is hidden by an application such that the at least one buddy list is not displayed on the display device.

6. The method as claimed in claim 5 wherein the states identified in the group message are comprised of a last valid state of each monitored user or device associated with that user.

7. The method as claimed in claim 5, further comprising increasing the predetermined time when the at least one buddy list is in the deactivated state for at least a first amount of time.

8. The method as claimed in claim 5, wherein the predetermined time is set user-individually or controller-individually.

9. The method as claimed in claim 5, wherein the at least one buddy list is configured to display realtime-critical state information of the user or device associated with the user and non-realtime-critical state information of the user or device associated with the user.

10. The method as claimed in claim 9, wherein at least one buddy list is in the deactivated state and the at least one buddy list in the deactivated state is also updated if a change in any non-realtime-critical states of the user or the device associated with the user is detected by the presence server via the update message without waiting for the predetermined time to elapse.

11. The method as claimed in claim 5, wherein following a change of the at least one buddy list from the deactivated state to the activated state the at least one buddy list is updated immediately.

12. The method as claimed in claim 5, wherein transmission of information regarding the deactivated state of the at least one buddy list takes places implicitly if a connection between a controller and the terminal is broken by the terminal.

13. The method as claimed in claim 5, wherein transmission of information regarding the at least one buddy list being in the activated state or deactivated state takes places by way of explicit signaling.

14. The method as claimed in claim 13, wherein for cases where a deactivated signal is signaled, information about whether updating the at least one buddy list should continue to take place or not is also transmitted.

15. The method as claimed in claim 5, wherein in the at least one buddy list is comprised of user information that is selected from the group consisting of: information about users to be monitored, information about the devices of the monitored users, and combinations thereof.

16. The method as claimed in claim 15, wherein the deactivated state exists if:
the at least one buddy list is hidden on the display device, or the user information is situated outside of a visible region of the display device, or the user information is shown by a symbol representing the user information, or a portion of the user information is shown by a symbol representing this portion.

17. The method as claimed in claim 5, wherein when the at least one buddy list is in the activated state, the at least one buddy list update message is sent to the at least one buddy list and the at least one buddy list is updated after the change in state of the device associated with the user occurs.

18. The method as claimed in claim 17, wherein when the at least one buddy list is in the activated state and the at least one buddy list is updated immediately after the change in state.

* * * * *